United States Patent [19]

Lieser et al.

[11] 4,065,844

[45] Jan. 3, 1978

[54] BEARING PULLER FOR WASHING MACHINES

[76] Inventors: Martin J. Lieser; Donna Jean Lieser, both of 2540 Kirkland Ave., Escondido, Calif. 92025

[21] Appl. No.: 712,688

[22] Filed: Aug. 9, 1976

[51] Int. Cl.[2] .............................................. B23P 19/04

[52] U.S. Cl. ......................................... 29/258; 29/263; 29/264

[58] Field of Search ................. 29/258, 263, 259, 260, 29/264, 265, 266, 261, 262

[56] References Cited

U.S. PATENT DOCUMENTS

| | | | |
|---|---|---|---|
| 725,739 | 4/1903 | Masterson | 29/262 X |
| 1,433,131 | 10/1922 | Giddings | 29/263 X |
| 1,445,001 | 2/1923 | Campbell | 29/263 X |
| 1,554,688 | 9/1925 | Nubson | 29/259 |
| 1,650,024 | 11/1927 | Maxwell | 29/262 |
| 1,736,529 | 11/1929 | Goeller | 29/263 |
| 1,754,059 | 4/1930 | Staser | 29/259 |
| 1,990,570 | 2/1935 | Smith | 29/262 |
| 2,036,782 | 4/1936 | Ullmo | 29/263 |
| 2,085,529 | 6/1937 | Heimbach et al. | 29/263 |
| 3,681,838 | 8/1972 | Tutino | 29/263 X |

FOREIGN PATENT DOCUMENTS

| | | | |
|---|---|---|---|
| 636,650 | 1/1928 | France | 29/265 |
| 664,276 | 4/1929 | France | 29/262 |
| 1,115,341 | 12/1955 | France | 29/263 |
| 687,423 | 2/1953 | United Kingdom | 29/263 |
| 1,830 of | 1914 | United Kingdom | 29/263 |
| 494,711 | 10/1938 | United Kingdom | 29/262 |

*Primary Examiner*—James L. Jones, Jr.
*Assistant Examiner*—J. T. Zatarga
*Attorney, Agent, or Firm*—Ralph S. Branscomb

[57] ABSTRACT

The invention is a means for removing an often noisy and troublesome upper spin tube bearing used in a Speed Queen washer and comprises an elongated rigid sheath configured to fit over the spin tube bearing housing, the sheath having a central threaded shaft extending therethrough to extend into the bearing housing and through the annular spin tube bearing, the bearing being removed by means of a pressure disc threaded on the shaft beneath the bearing and drawn upwardly by rotating a nut on an upper portion of the shaft.

3 Claims, 5 Drawing Figures

44
38
40
46
42
26
34
24
28
42
30
48
50
52

3
3
46
38
40
36
42
44
26
34
32
24
20
22
48
28
50
16
30
30
18
42
14
12
10

44
34
38
40
46

BEARING PULLER FOR WASHING MACHINES

BACKGROUND OF THE INVENTION

Washing machines are ordinarily provided with an inner tub which rotates on a shaft which extends downwardly and is supported within a cylindrical bearing housing by a pair of annular ball bearing rings. Over a period of time, these bearings, particularly the upper spin tube bearing, will become worn and cause the machine to become noisy in operation. In laundromats, in which the machines are subject to heavy use, the upper bearing frequently becomes worn and the sounds made by the machine in this condition can reach the level of a bloodcurdling screech above which no ordinary conversation can be maintained. Although this is a prevalent problem in laundromats, and although machines marketed under the trademark Speed Queen are in wide use in laundromats, this machine is so constructed that to remove and replace the upper spin tube bearing is an 8 hour job according to the factory manual, and in practice works out to be at least five hours even when working fast due to the timeconsuming dismantling and reassembly of the machine which must take place. The assembly is so arranged that almost the entire machine must be dismantled to make the upper spin tube bearing accessible, and according to the manual, when it is accessible in the bearing housing it is driven out by a wooden block and hammer so that the new bearing may be installed.

SUMMARY OF THE INVENTION

The present invention permits the upper spin tube bearing in Speed Queen washers to be removed in slightly more than an hour by making unnecessary the removal of the main bearing housing from the remainder of the machine, it being the removal of this part which entails the bulk of the dismantling and reassembly time ordinarily required to remove the bearing. By use of the tool, which comprises in essence a cylindrical sheath which serves as a brace and through which a threaded shaft extends to engage and draw up the bearing, the bearing may be removed subsequent to the removal of the inner wash tub and spin tube and a few parts connected to the lower end of the spin tube which extends beyond the bearing housing.

DETAILED DESCRIPTION OF THE PREFERRED EMBODIMENT

Figures 1, 2, 3:
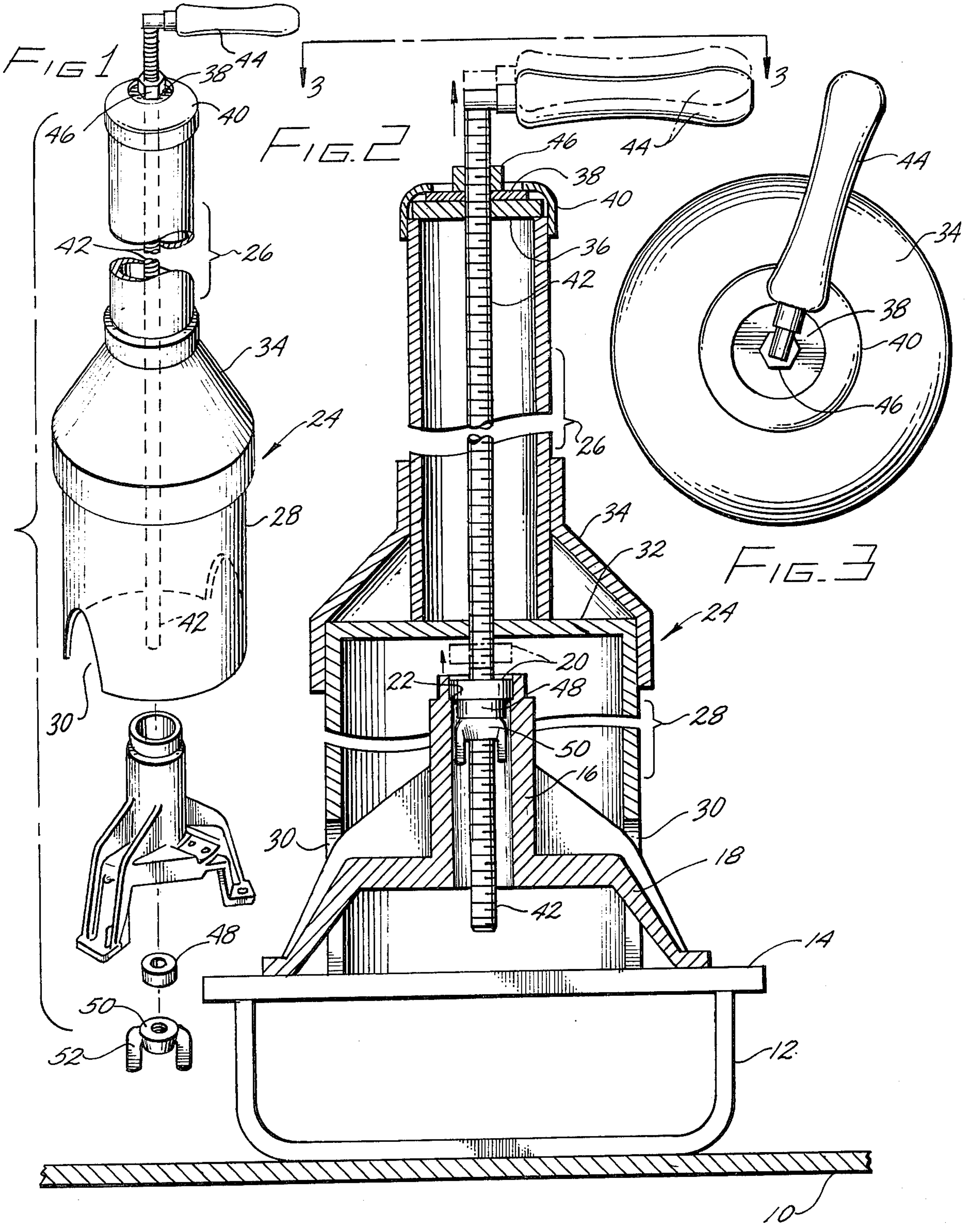
FIG. 1 is an exploded perspective view of the sheath shown as it fits over a spin tube bearing housing.
FIG. 2 is a sectional view of the bearing remover shown positioned over a bearing housing which is mounted to other washer structure.
FIG. 3 is a top elevational view taken along line 3—3 of FIG. 2.

The bearing puller of the present invention was designed for use specifically with Speed Queen brand washers, this brand comprising the majority of the machines used in laundromat facilities and thus being frequently in need of having their upper spin tube bearings replaced. The drawings illustrate the bearing puller as it operates on a few essential parts of the machine, the machine itself and the great majority of the parts used in the machine having been omitted for simplicity. The structure of the washer which is shown includes a frame member 10 having a pivot yoke 12 which supports a mounting plate 14 to which is mounted a spin tube bearing housing 16 which is cylindrical in form and is mounted by means of a pair of angulated legs 18 to the mounting plate.

The following structure has already been removed from the bearing housing which is shown in the drawings. First, the inner wash tub, which is provided with an upwardly and centrally extending spindle which is hollow and coaxially mounted on the bearing housing is removed, this spindle having a shaft that is called a spin tube which extends downward through the cylindrical bearing housing 16 to support the rotational wash tub. A pair of bearings are needed in the housing to rotationally support the spin tube, the lower bearing having been removed from the spin tube shown in the drawings and the upper bearing being the subject of this invention and is shown at 20. The spin tube of the wash tube extends downwardly through the bearing housing and is provided with a retainer and a drive pulley which have been removed prior to the stage of assembly which is illustrated. The mounting plate 14 has a central opening such that the bottom of the bearing housing is accessible by hand from beneath the mounting plate, the area beneath the mounting plate also being accessible by hand through the remaining portions of the washer.

For reasons that are not apparent from the drawings and will not be detailed herein, it is the removal of the spin tube bearing housing 16 that is responsible for hours of labor and requires the dismantling of a large portion of the washer so that the spin tube bearing housing may be freed and the upper spin tube bearing 20 pounded out with a wooden block and mallet. The upper spin tube bearing rests in a shoulder 22 on the inside of the housing and, especially with age, becomes seated so securely that a tremendous force is needed to remove it.

Turning now to the structure of the invention, an elongated sheath is generally designated at 24 and in the preferred embodiment comprises upper and lower tube portions 26 and 28, respectively. The lower tube portion has cut away areas 30 such that the lower tube portion may straddle the angulated legs 18 as it encloses the bearing housing. The lower tube is braced against the mounting plate 14 and, together with the upper tube, is composed of a tough plastic or the like having strength sufficient to withstand considerable compressive forces. In view of the strength necessary in the sheath, the upper tube rests directly on a metallic platform 32 which rests atop the lower tube and ideally would be glued thereto, although conceivably the platform could be maintained in place by means of an external fairing 34, which is preferably composed of the same tough material from which the tubes are made and is adhered securely to the tubes so that a one-piece housing is defined. Note however that the straight cylindrical upper tube rests directly on the platform so that the fairing 34 need not endure forces which it might not be able to withstand due to its flared shape.

The upper end of the upper tube 26 has an end plate 36 attached thereto in a fashion similar to that of the platform 32 and above this end plate is a bearing washer 38 which is free to rotate in sliding fashion against the end plate 36, and is retained by a retainer cap 40 which is adhered to the upper tube and also serves as a fairing similar to that at 34 to provide the overall apparatus with a smooth appearance, and to eliminate the possibility of the grease or grime prevalent in areas which the tool will be used from lodging in crevices of the tool which would otherwise be exposed.

Centrally extended through the sheath is a threaded shaft 42 preferably having an orthognally extended handle 44 mounted to the top end. A nut 46 is engaged on the shaft beneath the handle and rests on the bearing washer 38 and it can be seen as this nut is rotated such as by means of an open end wrench, the shaft will be raised or lowered provided it is maintained non-rotational by means of the handle, a position being shown in phantom in FIG. 2 indicating the raised shaft.

The shaft extends through openings in the end plate 36 and lower platform 32 and passes generally coaxially through the cylindrical portion of the bearing housing 16 so that the lower end is exposed beneath the housing. As previously mentioned, there is an opening in the mounting plate 14 which permits access to the lower end portion of the housing from beneath this mounting plate, and it is through this access route that, once the shaft has been extended through the bearing housing and through the bearing itself, a pressure disc 48 is slipped onto the end of the shaft and retained there by means of a modified wing nut 50. The purpose of the pressure disc, which is of diameter greater than the inner diameter of the annular bearing 20, is to draw the bearing upwardly as the shaft is raised and free it from its housing, and thus the wing nut 50 is provided with finger pieces 52 which are heavy enough to provide additional angular momentum to the nut so that it may be spun on and by its own momentum will raise the pressure disc into contact with the upper bearing prior to its removal.

Thus in summary of the operation of the device, after the washer has been dismantled to the extent that only those parts illustrated remain in the sphere of operation, the elongated sheath with the shaft in the raised position and having the wing nut and pressure disc removed is inserted over the bearing housing such that the cut-away portions of the lower tube aligned with the angulated legs 18. When the sheath is firmly resting on the mounting plate, the shaft is lowered through the upper spin tube bearing 20 and through the bearing housing so that the end projects beneath the housing and the upper nut 46 rests on the bearing washer 38. At this point, the pressure disc is engaged on the bottom end of the shaft, which is done by reaching through the hole in the mounting plate, and in the same fashion the weighted wing nut is attached to the shaft and twirled upwardly until it brings the pressure disc against the bearing. The apparatus is now ready for the actual removal of the bearing, and this is accomplished by holding the handle 44 in one hand and with an open end or crescent wrench rotating the nut 46 such that the shaft moves into the position illustrated in phantom in FIG. 2 and the bearing pops free, also indicated in phantom in FIG. 2. The bearing puller is no longer attached to the washing machine structure and can be simply lifted out of place and a new bearing inserted in the shoulder area 22, and the machine is ready for reassembly.

I claim:

1. A tool for removing the annular upper spin tube bearing from an automatic washing machine having a generally cylindrical main bearing housing supported by a pair of angulated legs above a mounting plate having an access opening therein through which the bottom of said main bearing housing is accessible, said tool comprising;

a. an elongated rigid sheath having: (i) an upper cylinder; and, (ii) a lower cylinder coaxial with and of larger diameter larger than said upper cylinder and dimensioned to fit over said main bearing housing;

b. said lower cylinder having two opposed cut away portions to receive said legs and a lower plane-defining edge to rest on said mounting plate such that the interior of said cylinder is accessible through the opening in said plate;

c. said upper cylinder having an upper end plate thereover with a bore therethrough;

d. a second plate having a central bore therein and disposed atop said lower cylinder such that said upper cylinder is supported on said second plate and including means to retain said second plate on said lower cylinder and center said upper cylinder on said second plate;

e. a threaded shaft extending through the bores in said plates and passing through said cylinders;

f. a removable pressure disc retained on the lower end of said shaft, said pressure disc being of a diameter greater than the interior diameter of said upper spin tube bearing;

g. a threaded nut disposed on said shaft above said end plate, whereby said cylinder can be disposed over a main bearing housing of a washer with the cut-away portions oriented over the angulated legs thereof, and said shaft can be lowered through said cylinder and through the upper spin tube bearing of said machine, said disc can be retained on the lower end of said shaft, and by rotating said threaded nut to elevate said shaft, said upper spin tube bearing will be removed from the bearing housing.

2. Structure according to claim 1 wherein said second plate is a circular disc of essentially the same diameter as said second cylinder and said means to retain said second plate on said lower cylinder and center said upper cylinder on said second plate comprises a generally conical fairing attached around a portion of said upper cylinder and expanding downwardly to embrace the upper edge of said lower cylinder and retain said second plate thereon.

3. Structure according to claim 2 wherein said first plate is retained by a cap having a central aperture therein to expose said nut whereby said tool is entirely integral, said cylinders are composed of a rigid plastic capable of withstanding great axial loading and said plates are metallic whereby said tool manifests high overall resistance to axial compressive forces at minimal weight.

* * * * *